(12) United States Patent
Costes et al.

(10) Patent No.: US 8,098,188 B2
(45) Date of Patent: Jan. 17, 2012

(54) METHOD OF CHARACTERIZING THE CONVECTION INTENSITY OF A CLOUD, BY A METEOROLOGICAL RADAR

(75) Inventors: Clémentine Costes, Brest (FR); Nicolas Bon, Brest (FR); Jean-Paul Artis, Plouzane (FR); Frédéric Mesnard, Campistrous (FR); Olivier Pujol, Villeneuve d,Ascq (FR); Henri Sauvageot, La Barthe-Inard (FR)

(73) Assignee: Thales (FR)

( * ) Notice: Subject to any disclaimer, the term of this patent is extended or adjusted under 35 U.S.C. 154(b) by 41 days.

(21) Appl. No.: 12/492,426

(22) Filed: Jun. 26, 2009

(65) Prior Publication Data

US 2010/0164786 A1    Jul. 1, 2010

(30) Foreign Application Priority Data

Jun. 27, 2008    (FR) .................................... 08 03634

(51) Int. Cl.
*G01S 13/00* (2006.01)
(52) U.S. Cl. ...................................... 342/25 R; 342/104
(58) Field of Classification Search ................... 342/25, 342/26, 104–146
See application file for complete search history.

(56) References Cited

U.S. PATENT DOCUMENTS

| 7,129,885 B1 | 10/2006 | Woodell et al. |
| 7,242,343 B1 | 7/2007 | Woodell |
| 7,307,576 B1 | 12/2007 | Koenigs |

OTHER PUBLICATIONS

Awaka, Juu, Rain Type Classification Algorithm for TRMM Precipitation RAdar, Aug. 8, 1997,Geoscience and Remote Sensing, 1997. IGARSS '97. Remote Sensing—A Scientific Vision for Sustainable Development., 1997 IEEE International, vol. 4, pp. 1633-1635.*
Jun Awaka et al., "Rain Type Classification Algorithm for TRMM Precipitation Radar", Geoscience and Remote Sensing—A Scientific Vision for Sustainable Development, Aug. 3-8, 1997, pp. 1633-1635, vol. 4, issue 3.
T.J. Smyth et al., "Radar Estimates of Rainfall Rates at the Ground in Bright Band and Non-Bright Band Events", Quarterly Journal of the Royal Meteorological Society, Oct. 1, 1998, pp. 2417-2434, vol. 124, No. 551, Royal Meteorological Society, Berkshire, GB.

(Continued)

*Primary Examiner* — Timothy A Brainard
(74) *Attorney, Agent, or Firm* — Baker & Hostetler, LLP

(57) ABSTRACT

The present invention relates to a method of characterizing the convection intensity of a cloud by a meteorological radar. The reflectivity of said cloud to an electromagnetic wave being distributed in space, the distribution of the reflectivity being discretized according to a network of points (i, j, k) of the space in three dimensions, at least one profile (22) is defined as a normalized function of a parameter (21), which is in turn a given numeric function in two dimensions (i, j) of the distribution of the reflectivity at each point of the network, said normalized function varying uniformly between a minimum constant value and a maximum constant value, the function being equal to the minimum value when the parameter is less than a low threshold (threshold min) and being equal to the maximum value when the parameter is greater than a high threshold (threshold max), the cloud being characterized as convective when the profile is equal to one of the constant values and as stratiform when it is equal to the other constant value.

The invention applies notably to meteorological radars on board aeroplanes.

12 Claims, 2 Drawing Sheets

OTHER PUBLICATIONS

J. Bandera et al., "Vertical Variation of Reflectivity and Specific Attenuation in Stratiform and Convective Rainstorms", Electronics Letters, Apr. 1, 1999, pp. 599-600, vol. 35, No. 7, IEE, Stevenage, GB.

Basim J. Zafar et al., "Classification of Precipitation Type from Space Borne Precipitation Radar Data and 2D Wavelet Analysis", Geoscience and Remote Sensing Symposium, 2004, Sep. 20, 2004, pp. 3570-3573, vol. 5, 2004 IEEE International, Anchorage, AK.

* cited by examiner

METHOD OF CHARACTERIZING THE CONVECTION INTENSITY OF A CLOUD, BY A METEOROLOGICAL RADAR

CROSS-REFERENCE TO RELATED APPLICATIONS

This application claims priority of French application no. FR 0803634, filed Jun. 27, 2008, the disclosure of which is hereby incorporated by reference in its entirety.

FIELD OF THE INVENTION

The present invention relates to a method of characterizing the convection intensity of a cloud by a meteorological radar. It applies notably to meteorological radars on board aeroplanes.

BACKGROUND OF THE INVENTION

During a flight, the pilot of an aeroplane generally uses a meteorological observation system deriving from a radar that gives him information concerning the state of the atmosphere in order to detect the risks inherent in the meteorological situations making it possible among other things to restore a Doppler speed field and a radar reflectivity field in three dimensions, 3D. These fields are obtained by performing successive scans with the radar according to different bearing and elevation angles. At each point of a 3D grid covering the extent of observation, radar reflectivity information is thus in particular made available that is dependent on the wavelength used and the reflection, absorption and diffusion properties of the targets present in the radar resolution volume. On the control screen, in the cockpit, the pilot then sees meteorological information displayed that is generally analysed on the basis of four colour levels corresponding either to the absence of signal or to a weak, moderate or strong reflectivity factor. The pilot interprets this information in terms of risk to decide if he can maintain the trajectory planned for his aeroplane or if he must modify it to avoid an area exhibiting meteorological risks, for example an area where a cloud is forming.

To simplify the approach of the pilot in his decision-taking, it is useful to translate the meteorological fields observed by the radar into a field describing the level of meteorological risk.

Generally, the meteorological radars on board aeroplanes operate in the X band. The radar reflectivity measured by a meteorological radar in the X band using a single wavelength exhibits an ambiguity regarding its relationship with the nature and the characteristics of the hydrometeors, such as water droplets, snowflakes or hail notably, that have generated it. In practice, this relationship is strongly non-bijective. Consequently, one and the same reflectivity level can be generated by hydrometeors of very different kinds, originating either from snow or hail notably, corresponding to meteorological situations that are also very different from the point of view of the aeronautical risk, for example stratiform clouds and thick convection clouds such as cumulonimbus. This bijectivity defect notably concerns the hail consisting of hailstones of a size greater than approximately a centimeter of equivalent spherical diameter. These hailstones fall outside the Rayleigh scattering domain, in which the meteorological radars usually work. They then fall in the Mie scattering domain which is such that when the size of the hailstone increases, its reflectivity diminishes.

It is therefore necessary to remove this ambiguity and obtain with a meteorological radar both information concerning the dynamic nature of the clouds generating the reflectivity field, stratiform clouds or intense convective clouds of stormy cumulonimbus type, and concerning the microphysical nature of the hydrometeors, deriving from rain, snow or large hailstones.

Solutions are known for eliminating this ambiguity. In particular, it is known how to determine the level of risk at each grid point by using simple thresholds on the radar reflectivity factor observed at these points. If the latter is greater than 40 dBZ, the risk is considered to be high whereas, if it is less than 30 dBZ, the risk is considered to be low. Between these two values, the risk is considered to be moderate. These thresholds can, if necessary, differ according to the regions being flown over in accordance notably with the description in the U.S. Pat. No. 7,129,885. This method of estimating the risk solely by the one-off value of the radar reflectivity notably has the drawback that it can lead to an underestimation or an overestimation of the risk in certain meteorological situations. For example, a strong snow shower in a stratiform system can be seen by a radar with high reflectivity factors, greater than 40 dBZ, although the situation presents no risk to the aircraft in flight.

SUMMARY OF THE INVENTION

One aim of the invention is notably to avoid this drawback and to eliminate the abovementioned ambiguity in a reliable manner. To this end, the subject of the invention is a method of characterizing the convection intensity of a cloud, the reflectivity of said cloud to an electromagnetic wave being distributed in space, the distribution of the reflectivity being discretized according to a network of points (i, j, k) of the space in three dimensions, at least one profile is defined as a function of a parameter, which is itself a given numerical function in two dimensions (i, j) of the distribution of the reflectivity at each point of the network, said function varying uniformly between a minimum constant value and a maximum constant value, the function being equal to the minimum value when the parameter is less than a low threshold (threshold min) and being equal to the maximum value when the parameter is greater than a high threshold (threshold max), the cloud being characterized as convective when the profile is equal to one of the constant values and as stratiform when it is equal to the other constant value.

Advantageously, the function of the parameter is, for example, normalized.

The numerical function in two dimensions (i, j), defining a parameter, is for example calculated in the horizontal plane.

A convective cloud corresponds for example to the high constant value.

The overall profile can be a profile field, in which a number of different profiles are combined, said different profiles being defined by normalized functions of parameters combining the different numeric parameters associated with each said different profiles.

The combination of the different profiles is, for example, by a weighted average.

A parameter is, for example, the integral of the reflectivity in the vertical dimension (z, k).

A parameter can be a measurement of the column height, in the vertical dimension, for which the points taken into account are those whose reflectivity value is greater than a given threshold.

A parameter can also be the maximum altitude at which the reflectivities are greater than a given threshold.

A parameter is, for example, the maximum reflectivity calculated in a given vertical.

A parameter is, for example, the vertical reflectivity gradient between a maximum reflectivity area and the maximum altitude at which the reflectivities are greater than a given threshold.

A parameter can also be the horizontal gradient of the reflectivity at a given altitude.

The parameter is, for example, calculated in a determined volume.

BRIEF DESCRIPTION OF THE DRAWINGS

Other features and benefits of the invention will become apparent from the figure that follows given in light of the appended drawings which represent.

MORE DETAILED DESCRIPTION

Figure 1:
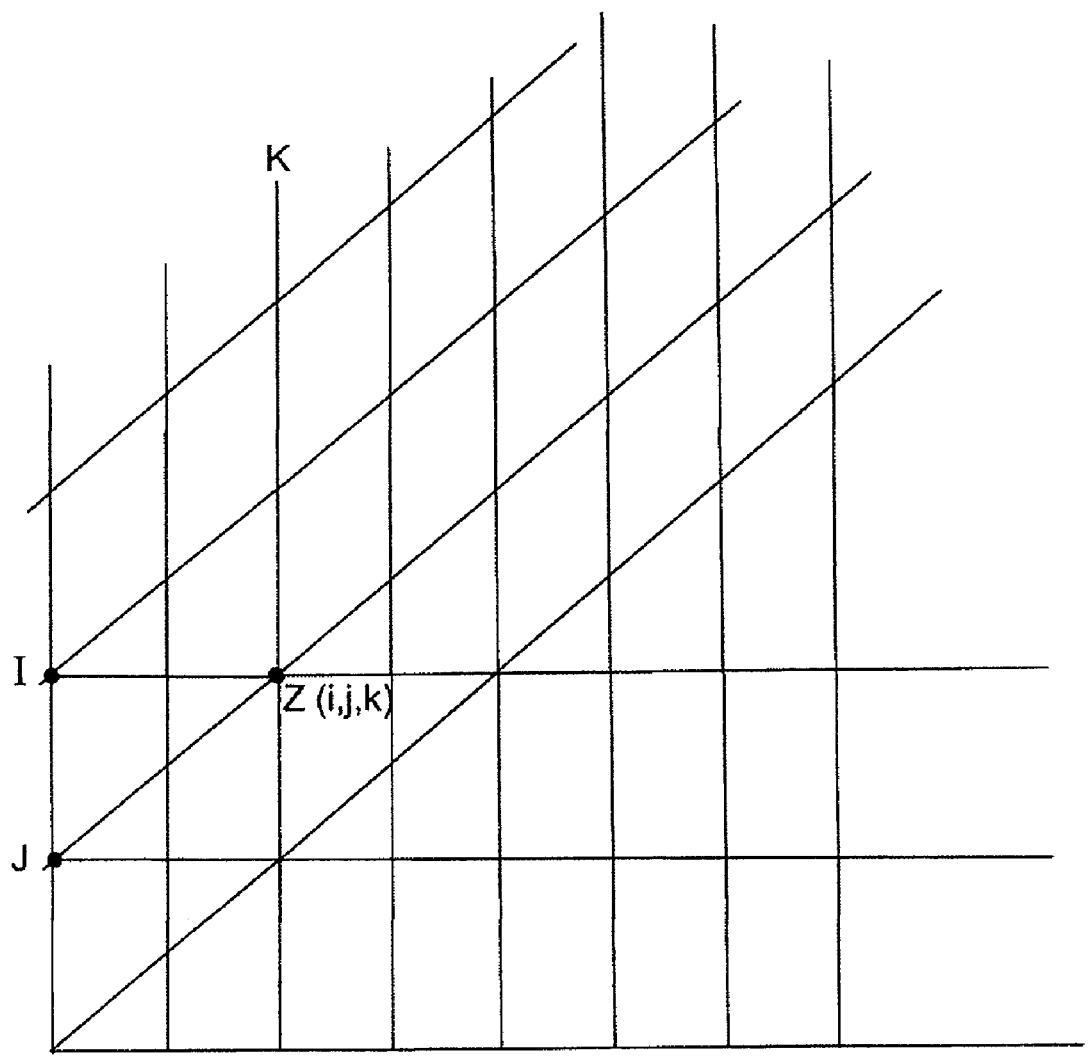
FIG. 1, an illustration of a radar reflectivity network within a cloud.

FIG. 1 illustrates a reflectivity grid in space. The space is discretized according to a network of points of the space, in three dimensions. This network forms a structure that is hereinafter called grid. Each point of the grid, identified by its index i on a row I, its index j on a row J and is index k on a row K exhibits a reflectivity $Z(i, j, k)$ which is detected by a meteorological radar. The indices i,j define the position of a point in the horizontal plane, and the index k defines the vertical position of this point. The duly discretized space is stored in the computer of the radar with the associated reflectivities $Z(i, j, k)$. A three-dimensional matrix is thus stored that will hereinafter be considered synonymous with the grid of the space. The terms reflectivity grid $Z(i, j, k)$ and reflectivity matrix $Z(i, j, k)$ can thus be used interchangeably. The reflectivity matrix can be renewed or updated in line with the observation periods of the radar. The reflectivity matrix corresponds to an observation domain covered by the radar.

The inventive method makes it possible to characterize the convection intensity of a cloud based on the spatial distribution of its reflectivity, more particularly as a function of the discretized spatial distribution, according to a grid for example. According to this characterization, it is then possible for the risks associated with this cloud to be estimated, by a pilot or, automatically, by means of an analysis program.

Figure 2:
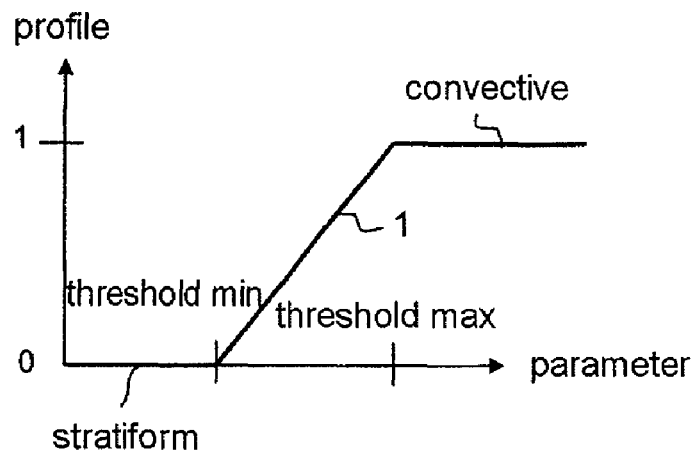
FIG. 2, a profile characterizing a cloud, used by a method according to the invention.

FIG. 2 shows a curve 1 that illustrates a normalization function defining a type of profile according to the value of a particular parameter, this profile defined by a curve that is a function of this parameter is of the two-dimensional type 2D.

The invention starts from the fact that, to estimate the level of risk at a point of the reflectivity grid, the one-off value of the reflectivity factor provides an ambiguous and therefore inadequate response. To complement the information relating to the reflectivity threshold, the invention considers a set of parameters relating to the spatial reflectivity distribution making it possible to determine the thick convective or stratiform character of a cloud. The knowledge of this character makes it possible not only to know the physical nature of the hydrometeors responsible for a signal received by a radar but also to correctly weight the risk associated with the dynamic of the clouds by identifying the convective or stratiform character.

Regarding the identification of profiles, a number of criteria must be taken into account to obtain this profile. These criteria are then analysed, for example using a decision tree, or even by acting like the terms of a weighted sum. In the latter case, the criteria being of different natures, they are, for example, normalized, for example so that each of them varies between the value 0 and the value 1 as illustrated in FIG. 2. The next step is to choose a high threshold, threshold max in FIG. 1, a low threshold, threshold min in FIG. 2, and a normalization function for each parameter. The function can be linear as in FIG. 1, and therefore vary linearly between threshold min and threshold max. The function can, however, take another form. These thresholds are chosen to be such that they correspond, according to the criterion adopted, for one, to an intense convective situation, i.e. the case of the high threshold, and for the other, to a stratiform situation, as is the case of the low threshold. Thus, after the criterion has been normalized, an intense convective profile obtains the score 1 whereas a stratiform profile obtains the score 0. If the profile is ambiguous or showing low-intensity convection, it obtains an intermediate score defined by the linear part of the curve. The various normalized criteria are weighted according to the confidence that can be given to each. The final score is compared to a threshold in order to determine the nature of the profile.

Figure 3:
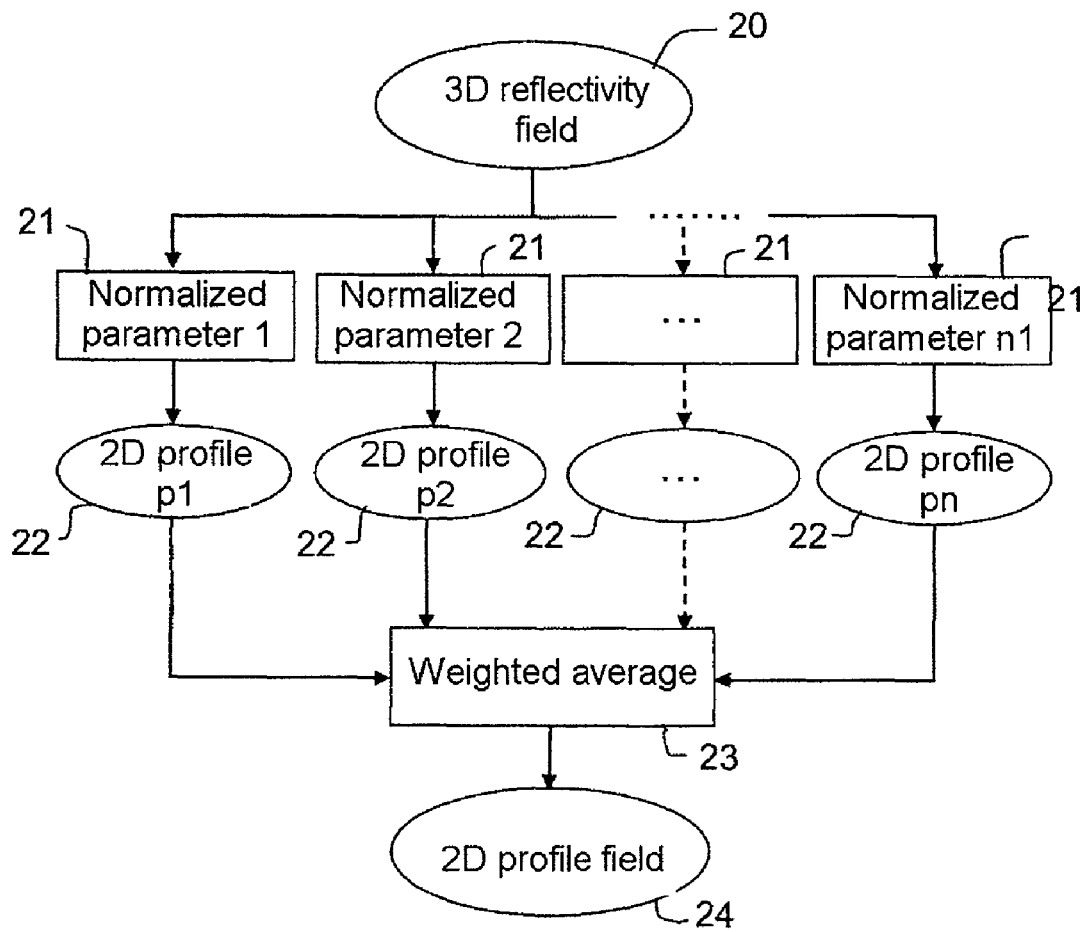
FIG. 3, an exemplary possible combination of profiles characterizing a cloud, in a method according to the invention.

FIG. 3 is a diagram illustrating the principle of the identification of stratiform or convective profiles used by a method according to the invention to estimate the meteorological risks.

From the 3D reflectivity field 20, and for each identification criterion, the corresponding parameter 21 is calculated, to which is applied a normalization function of the type of that illustrated by FIG. 2. Thus, as many profile fields 22, in 2D, as there are selected criteria are obtained. The example of FIG. 2 comprises n criteria. In a limiting case, it is possible to use only a single criterion, in which case n=1.

The profile fields are, for example, thereafter combined for a function 23 which can be a weighted average in order to obtain a single profile field 24 that can be used to determine the microphysical type of the hydrometeors and the level of risk being run by the aeroplane.

A number of identification criteria can therefore be used. As indicated previously, a meteorological radar makes it possible to restore a Doppler speed field and reflectivity fields in three dimensions, 3D. At each point of a 3D grid, previously defined and as illustrated for example by FIG. 1, and covering an observation domain, reflectivity information is thus available.

The microphysical characteristics of the hydrometeors have to be determined for each point of the grid, but the stratiform/convective profile thereof can be identified by considering only a single point. The invention proposes a number of parameters that make it possible to identify profiles.

They are calculated from reflectivities measured at all grid points vertical to the point concerned.

From the 3D reflectivity field supplied by the radar, and possibly interpolated in an appropriate frame of reference, for example the geocentered latitude—longitude—altitude frame of reference, the method according to the invention calculates a 2D field of values for each identification parameter.

A first possible criterion, called VIZ, is the integral of the reflectivity along the vertical, at a given point according to the horizontal. It is representative of the quantity of precipitations at that given point. VIZ is determined by calculating the integral of the reflective Z according to the vertical:

$$VIZ(x, y) = \int_0^{z_{max}} Z(x, y, z) dz \qquad (1)$$

in which x and y designate the Cartesian coordinates of the point on the horizontal and z the vertical coordinate, the integral being calculated up to a maximum coordinate $z_{max}$ along the vertical.

Given that the reflectivity values on the vertical are given in the 3D grid in a discrete manner, the numeric calculation of the 2D field of VIZ is therefore given by the following equation:

$$VIZ_{ij} = \sum_{k=0}^{k_{max}} Z_{ijk} \qquad (2)$$

in which i and j represent the indices on the two horizontal dimensions and k the vertical index, $Z_{ijk}$ is the reflectivity at the point of indices i, j and k of the reflectivity grid.

Its sum defined by the equation (2) can be replaced by the sum of the precipitation intensities on the vertical.

Another possible parameter is the column height, denoted $H_{column}$. One of the main characteristics of the convective areas is their great vertical extension. The column height criterion represents the cumulative height of a column of reflectivity values greater than a given threshold. The column height criterion, at a point of indices i, j on the horizontal, is thus given by the following equation:

$$H_{column} = \sum_{k=0}^{k_{max}} \delta_{z_{ijk}} \Delta A_{ijk} \qquad (3)$$

with $$\delta_z = \begin{vmatrix} 1 & \text{if } Z > \text{ threshold} \\ 0 & \text{otherwise} \end{vmatrix}$$

In this equation (3), $\Delta A_{ijk}$ represents the pitch in distance along the vertical axis at the level of the point of the grid of indices i, j and k, k being the index along the vertical, and $k_{max}$ being the index of the highest point. Z is the reflectivity at the point i, j, k.

Another criterion that can be used by the invention complements the column height. It is hereinafter called pulse echo and denoted Epulse. It can be used to improve the probability of detection in certain configurations, notably for anvil-form cumulonimbus. It corresponds to the altitude of the highest echo on an observation column detected by the radar. For each column identified in the horizontal plane by a pair of indices (i, j) in the reflectivity grid, the element of highest vertical index k is sought for which the reflectivity is greater than a given threshold. In each pair (i, j), the value of the pulse echo field is the altitude of the element found, and the criterion Epulse is given by the following equation:

$$Epulse_{ij} = \max^k (A_{ijk}, Z_{ijk} > 0) \qquad (4)$$

in which $A_{ijk}$ designates the altitude of a point of the reflectivity grid and $\max^k$ the maximum according to k.

Another possible criterion is the maximum reflectivity factor encountered in a column, Zmax. It provides a way of rapidly locating the areas of intense precipitation, such as hail, strong rain or snow. Zmax, according to a column defined by its indices i, j in the horizontal plane, is obtained according to the following equation:

$$Zmax_{ij} = \max^k (Z_{ijk}) \qquad (5)$$

Another possible criterion is the vertical reflectivity gradient, $grad_v(Z)$. This is the vertical reflectivity gradient between the altitude corresponding to the factor Zmax and that of the peak of the echoes, that is to say, between the altitude $z_M$ where the maximum reflectivity is observed and the pulse echo Epulse. If the maximum reflectivity extends over a number of grid points, the mean altitude is then considered. The gradient $grad_v(Z)$ is given by the equation (7) deriving from the following equation (6):

$$grad_v Z(x, y, z) = \frac{Z(x, y, z_M) - Z(x, y, Epulse)}{z_M - Epulse} \qquad (6)$$

In the numeric domain, by considering the discretized points of the grid, at a point of indices i, j, k:

$$grad_v Z = Z(A_{ijk}, Z_{ijk} = Zmax) - Z(A_{ijk}, A_{ijk} = Epulse) \qquad (7)$$

Another possible criterion is the horizontal reflectivity gradient, $grad_H(Z)$. This is the reflectivity gradient on a horizontal plane at a chosen altitude z. Because of the bidirectional character of this gradient, its norm is for example considered, given by the following equation:

$$\|grad_H Z(x, y, z)\| = \left[ \left(\frac{\partial Z}{\partial x}\right)_z^2 + \left(\frac{\partial Z}{\partial y}\right)_z^2 \right]^{1/2} \qquad (9)$$

From the numeric point of view, at a point i, j, k of the reflectivity grid, the horizontal gradient is obtained according to the following equation:

$$\|grad_H Z_{ijk}\|_{ij,k=k_c} = \left[ \left(\frac{Z_{(i+1)j,k=k_c} - Z_{ij,k=k_c}}{d_i}\right)^2_{ij,k=k_c} + \left(\frac{Z_{i(j+1),k=k_c} - Z_{ij,k=k_c}}{d_j}\right)^2_{ij,k=k_c} \right]^{1/2} \qquad (10)$$

using $d_i$ and $d_j$ to denote the pitch on the horizontal dimensions x and y respectively.

Another criterion which can be used to identify a profile is the reflectivity $Z_{1500}$ above the 0° C. isotherm, at an altitude of approximately 1500 meters.

$$Z_{1500} = Z(i,j,k_{1500}) \qquad (11)$$

in which $k_{1500}$ is such that $A_{ijk_{1500}} = A_{ijk_{0°C.}} + 1500$, $A_{ijk_{0°C.}}$ being the altitude of the 0° C. isotherm.

The preceding criteria or parameters are based on the analysis of a reflectivity column. It is also possible according to the invention to use volume criteria. In particular, other criteria based on different volumes can be used. The calculated profile field can thus become a 3D field.

In the example of a sphere, for each point i, j, k of the space where a profile type is to be calculated, a sphere of fixed radius centred on this point is considered. Some of the preceding parameters then acquire a different definition. The criterion VIZ becomes an integration criterion in space which then represents the sum of the reflectivities in the reference volume, the sphere in this example. The criterion Zmax becomes a maximum reflectivity factor observed in this reference volume.

Other volume criteria can be defined:

The total volume $V_{Zthreshold}$ for which the reflectivity factor Z is greater than a determined threshold $Z_{threshold}$. This involves summing the individual volumes for which Z exceeds a threshold value $Z_{threshold}$ (for example 35 dBZ). This parameter indicates the volume where the convection has reached its full development term. A number of thresholds can be envisaged;

The continuous volume $V_{continuous, Zthreshold}$ for which the reflectivity factor Z is greater than a determined threshold $Z_{threshold}$. The method is identical to the calculation of $V_{Zthreshold}$, except that the continuity of the calculated volume must be assured. Thus, to be counted, each grid point must have at least a certain number of neighbours such that $Z>Z_{threshold}$. This number is set initially and it is less than or equal to 18 which is the total number of edges and faces of a cube. It is also possible to add a condition concerning the minimum height to be considered and for example take the altitude of the 0° C. isotherm. This parameter gives the volume of the area generating the convective precipitation;

The average reflectivity Zave in $V_{continuous, Zthreshold}$, this parameter also applies to the other volumes such as a column or a sphere for example;

The ratio of the axes of an ellipsoid for which Z is greater than a fixed threshold $Z_{threshold}$. The aim here is to best represent the geometrical figure corresponding to $Z>Z_{threshold}$ by an ellipsoid, the axes of which are $a_V$ on the vertical and $a_H$ on the horizontal plane. The ratio $a_V/a_H$ is then formed, and a threshold is set that makes it possible to separate a profile of convective type from a profile of stratiform type.

It is also possible to use statistical quantities concerning volumes, such as, for example, the spatial variance of the reflectivity. This indicates the presence of a uniform system, consisting of a single cell, or of a number of cells.

For each of the identification parameters defined previously, two thresholds, high and low, are needed in the normalization function to calculate the profile, as illustrated notably by FIG. 2. These thresholds are, for example, chosen according to the analysis of radar observations of typical events, for example a characteristic snow or hail storm recorded at a given point of the globe.

The characteristics of the distributions of the precipitation intensities and therefore reflectivity can differ according to the climatology of the place of observation. It may then be necessary to adapt the thresholds according to climatological considerations.

Moreover, the altitude thresholds, for the pulse echo and column height criteria, may require adaptation according to the latitude of the area observed. In practice, the staging of the clouds in altitude is conditioned by the tropopause, the altitude of which depends on the latitude of the place.

As FIG. 3 illustrates, it is possible to perform a multiple-criteria identification. The identification of a convection profile can be done according to a single criterion, but the reliability of this identification is significantly increased by using a number of criteria. A profile field 22 is calculated for each of the chosen parameters 21. The different fields obtained in this way are combined to obtain a single profile field 24. These fields can be combined by calculating an average 23 with weights, possibly different, associated with the identification criteria. These weights can also be adapted according to climatological considerations, like the parameter thresholds.

A benefit of the invention is notably that it enables convection intensity information to be extracted from reflectivity information, in an effective manner.

The invention applies to the reflectivity observations made by a meteorological radar, notably airborne, operating in the X band. It can also apply to radars operating in other frequency bands, for example in the W, Ka, C or S band, of polarimetric or non-polarimetric type, with or without Doppler effect.

The invention claimed is:

1. A method of using a meteorological radar to characterize the convection intensity of a cloud, the reflectivity of said cloud determined by an electromagnetic wave being distributed in space, said method comprising:
   detecting a distribution of the reflectivity of the cloud with the meteorological radar;
   discretizing the distribution of the reflectivity according to a network of points (i, j, k) of the space in three dimensions;
   defining a profile (22) as a function (1) of a parameter (21), said parameter being a given numerical function in two dimensions (i, j) of the distribution of the reflectivity at each point of the network; and
   combining a number of the profiles (22) into an overall profile (24), said profiles (22) each being defined by a normalized function of numeric parameters associated with each of the said profiles (22),
   said normalized function varying uniformly between a minimum constant value and a maximum constant value, said normalized function being equal to the minimum value when the normalized parameter is less than a low threshold (threshold min) and being equal to the maximum value when the normalized parameter is greater than a high threshold (threshold max),
   the cloud being characterized as convective when the overall profile is equal to one of the maximum and minimum constant values and as stratiform when the overall profile is equal to the other of the maximum and minimum constant values.

2. The method according to claim 1, wherein the function (1) of a parameter (21) associated with a profile (22) is normalized.

3. The method according to claim 1, wherein the numerical function in two dimensions (i, j), defining a parameter, is calculated in the horizontal plane.

4. The method according to claim 1, wherein a convective cloud corresponds to the high constant value.

5. The method according to claim 1, wherein the combination of one of the normalized parameters (21) and the profiles (22) is a weighted average.

6. The method according to claim 1, wherein a parameter (21) is the integral of the reflectivity in the vertical dimension (z, k).

7. The method according to claim 1, wherein a parameter (21) is a measurement of the column height, in the vertical dimension, for which the points taken into account are those whose reflectivity value is greater than a given threshold.

8. The method according to claim 1, wherein a parameter (21) is the maximum altitude at which the reflectivities are greater than a given threshold.

9. The method according to claim 1, wherein a parameter (21) is the maximum reflectivity calculated in a given vertical.

10. The method according to claim 1, wherein a parameter (21) is the vertical reflectivity gradient between a maximum reflectivity area and the maximum altitude at which the reflectivities are greater than a given threshold.

11. The method according to claim 1, wherein a parameter (21) is the horizontal gradient of the reflectivity at a given altitude.

12. The method according to claim 1, wherein the parameter (21) is calculated in a determined volume.

* * * * *